(12) United States Patent
Liu

(10) Patent No.: US 12,105,386 B2
(45) Date of Patent: Oct. 1, 2024

(54) DISPLAY PANEL AND MANUFACTURING METHOD THEREOF

(71) Applicant: Wuhan China Star Optoelectronics Technology Co., Ltd., Hubei (CN)

(72) Inventor: Guangkun Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/771,882

(22) PCT Filed: Apr. 18, 2022

(86) PCT No.: PCT/CN2022/087323
§ 371 (c)(1),
(2) Date: Apr. 26, 2022

(87) PCT Pub. No.: WO2023/184605
PCT Pub. Date: Oct. 5, 2023

(65) Prior Publication Data
US 2024/0168345 A1    May 23, 2024

(30) Foreign Application Priority Data
Mar. 29, 2022  (CN) .......................... 202210318035.4

(51) Int. Cl.
*G02F 1/1333* (2006.01)
*G02F 1/133* (2006.01)
(Continued)

(52) U.S. Cl.
CPC ...... *G02F 1/13452* (2013.01); *G02F 1/13306* (2013.01); *G02F 1/1347* (2013.01); *G02F 1/13456* (2021.01); *G02F 2202/28* (2013.01)

(58) Field of Classification Search
CPC .................................................... G02F 1/1345
See application file for complete search history.

(56) References Cited

U.S. PATENT DOCUMENTS

2006/0023153 A1*  2/2006  Taguchi ............. G02F 1/13452
                                                        349/147
2008/0291379 A1   11/2008  Takenaka et al.
(Continued)

FOREIGN PATENT DOCUMENTS

CN       101101769      1/2008
CN       106773204      5/2017
(Continued)

OTHER PUBLICATIONS

Notification of Office Action and Search Report Dated May 12, 2023 From The State Intellectual Property Office of the People's Republic of China Re. Application No. 202210318035.4 and Its Translation Into English. (16 Pages).
(Continued)

*Primary Examiner* — Sang V Nguyen

(57) ABSTRACT

A display panel and a manufacturing method thereof are provided by the present application. The display panel includes a first liquid crystal cell, a second liquid crystal cell, and a flexible circuit board. The first liquid crystal cell includes a first epitaxial portion. The first epitaxial portion includes a plurality of first bonding terminals. The second liquid crystal cell includes a second epitaxial portion. The second epitaxial portion includes a plurality of second bonding terminals. And the second binding terminals and the first binding terminals are located on a same side. The flexible circuit board is electrically connected with the first binding terminals and the second binding terminals.

20 Claims, 4 Drawing Sheets

(51) Int. Cl.
*G02F 1/1345* (2006.01)
*G02F 1/1347* (2006.01)

(56) References Cited

U.S. PATENT DOCUMENTS

| | | | |
|---|---|---|---|
| 2011/0147747 A1* | 6/2011 | Jeon | H01L 27/1218 257/E33.001 |
| 2018/0275445 A1 | 9/2018 | Katagiri et al. | |
| 2020/0004078 A1 | 1/2020 | Yabuki | |
| 2021/0247636 A1* | 8/2021 | Xiao | G02F 1/13475 |
| 2022/0390782 A1* | 12/2022 | Yu | G02F 1/136222 |

FOREIGN PATENT DOCUMENTS

| | | | |
|---|---|---|---|
| CN | 107123369 | 9/2017 | |
| CN | 108227318 * | 6/2018 | G02F 1/1345 |
| CN | 110335545 | 10/2019 | |
| CN | 111897161 | 11/2020 | |
| CN | 211956056 | 11/2020 | |
| CN | 211956076 | 11/2020 | |
| CN | 212647211 * | 3/2021 | G02F 1/1333 |
| CN | 113009742 | 6/2021 | |
| CN | 113703214 | 11/2021 | |
| CN | 114019738 | 2/2022 | |
| JP | 2020-134848 | 8/2020 | |
| JP | 2021-162802 | 10/2021 | |

OTHER PUBLICATIONS

International Search Report and the Written Opinion Dated Nov. 28, 2022 From the International Searching Authority Re. Application No. PCT/CN2022/087323 and Its Translation Into English. (19 Pages).

* cited by examiner providing a first liquid crystal cell and a second liquid crystal cell, wherein, the first liquid crystal cell comprises a first epitaxial portion, the first epitaxial portion comprises a plurality of first binding terminals, and the first binding terminals are disposed on a side of the first epitaxial portion, the second liquid crystal cell comprises a second epitaxial portion, the second epitaxial portion comprises a plurality of second binding terminals, the second binding terminals are disposed on a side of the second epitaxial portion, and the second binding terminals and the first binding terminals are located on a same side — B001 bonding a flexible circuit board on the first binding terminals and the second binding terminals, so that the flexible circuit board and the first binding terminals and the second binding terminals are electrically connected — B002

FIG. 7

DISPLAY PANEL AND MANUFACTURING METHOD THEREOF

RELATED APPLICATIONS

This application is a National Phase of PCT Patent Application No. PCT/CN2022/087323 having International filing date of Apr. 18, 2022, which claims the benefit of priority of Chinese Patent Application No. 202210318035.4 filed on Mar. 29, 2022. The contents of the above applications are all incorporated by reference as if fully set forth herein in their entirety.

FIELD AND BACKGROUND OF THE INVENTION

The present application relates to the field of display technology, in particular to a display panel and a manufacturing method thereof.

A dual cell technology is also called a stack screen technology, which means that a colored display layer (main cell) and a black and white light control layer (sub cell) are overlapped together. This technology is equipped with high dynamic range (HDR) rendering technology, which can make a bright part of an image brighter and a dark part darker to achieve ultra-high contrast, a black detail performance is close to an organic light-emitting diode (OLED) display panel, and a brightness of a highlighted part exceeds the OLED display panel. The dual cell technology uses a pixel-scale subdivision dimming of a liquid-crystal panel for control, and realizes a local dimming technology of millions of individual areas, each millimeter interval of a screen may be several controllable backlight partitions. A light source partition accuracy achieved by this technology is difficult to achieve with traditional backlight technology, and has great application prospects. Some people also use the dual cell solution to design a dynamic privacy protection solution, that is, one display screen performs normal display, and another display screen switches between wide and narrow viewing angles, thereby realizing dynamic privacy protection. Taking the dual cell solution with the dynamic privacy protection as an example, a dual cell display panel includes a display liquid crystal cell and a dimming liquid crystal cell. The display liquid crystal cell is used for display, and the dimming liquid crystal cell is used to adjust an exit angle of a backlight module, when the dimming liquid crystal cell is lit and driven, a light-emitting angle in a backlight module can be scattered to achieve shared state display, when the dimming liquid crystal cell is not powered on, the dimming liquid crystal cell can converge an angle emitted by the backlight module to realize dynamic privacy protection and privacy state display. Therefore, privacy and sharing can be freely switched through the dimming liquid crystal cell.

However, in an existing dual cell display panel, two flexible circuit boards are usually required to bind the display liquid crystal cell and the dimming liquid crystal cell respectively, which not only increases a connection energy consumption, but also increases manufacturing cost of a display panel due to a large number of flexible circuit boards.

Therefore, it is necessary to propose a new technical solution to solve above-mentioned technical problems.

SUMMARY OF THE INVENTION

Embodiments of the present application provide a display panel and a manufacturing method thereof, which are used to solve a problem of the prior art that two liquid crystal cells need to be bound with two flexible circuit boards respectively, which leads to high manufacturing cost of the display panel.

The present application provides a display panel, including:
  a first liquid crystal cell, the first liquid crystal cell including a first epitaxial portion, the first epitaxial portion including a plurality of first binding terminals, and the first binding terminals disposed on a side of the first epitaxial portion;
  a second liquid crystal cell, the second liquid crystal cell disposed on the first liquid crystal cell, the second liquid crystal cell including a second epitaxial portion, the second epitaxial portion including a plurality of second binding terminals, the second binding terminals disposed on a side of the second epitaxial portion, and the second binding terminals and the first binding terminals located on a same side;
  a flexible circuit board, the flexible circuit board electrically connected to the first binding terminals and the second binding terminals.

Optionally, in the embodiments of the present application, the first binding terminals include first side surfaces, and the first side surfaces correspond to a side surface of the first epitaxial portion; and the second binding terminals include second side surfaces, the second side surfaces correspond to a side surface of the second epitaxial portion, and the first side surfaces and the second side surfaces are flush.

Optionally, in the embodiments of the present application, along an arrangement direction of the first binding terminals and the second binding terminals, at least a part of any one of the second binding terminals is staggered to at least a part of one of the first binding terminals.

Optionally, in the embodiments of the present application, the flexible circuit board includes a first portion and an extension portion extending along a first direction, the display panel further includes a conductive glue, the conductive glue is attached to the first side surfaces and the second side surface, and the first portion of the flexible circuit board is attached to a side of the conductive glue away from the first binding terminals and the second binding terminals.

Optionally, in the embodiments of the present application, the display panel further includes:
  a driving chip, the driving chip disposed on the extension portion of the flexible circuit board, and the driving chip and the first liquid crystal cell are located on a same side of the flexible circuit board.

Optionally, in the embodiments of the present application, the display panel further includes:
  a first adhesive layer, the first adhesive layer disposed on a side of the first epitaxial portion away from the second epitaxial portion;
  a second adhesive layer, the second adhesive layer disposed on a side of the flexible circuit board away from the first binding terminals and the second binding terminals.

Optionally, in the embodiments of the present application, the display panel further includes:
  a driving chip, the driving chip disposed on a side of the second epitaxial portion away from the first liquid crystal cell.

Optionally, in the embodiments of the present application, the display panel further includes:

a first adhesive layer, the first adhesive layer disposed on a side of the first epitaxial portion away from the second epitaxial portion;

a second adhesive layer disposed on a surface of the second epitaxial portion away from the first epitaxial portion, the second adhesive layer at least corresponds to the second binding terminals, and the second adhesive layer extends to side surfaces of the conductive glue and the flexible circuit board.

Optionally, in the embodiments of the present application, the display panel further includes:

a driving chip, the driving chip located on a side of the first epitaxial portion close to the second liquid crystal cell.

Optionally, in the embodiments of the present application, the display panel further includes:

a printed circuit board, the printed circuit board disposed on the extension portion of the flexible circuit board, and the printed circuit board and the first liquid crystal cell located on a same side of the flexible circuit board;

a driving chip, the driving chip and the first liquid crystal cell located on a same side of the printed circuit board.

Optionally, in the embodiments of the present application, a material of the conductive glue includes conductive gold balls arranged in an array.

Optionally, in the embodiments of the present application, diameters of the conductive gold balls are less than or equal to 3 microns.

Optionally, in the embodiments of the present application, the flexible circuit board includes a plurality of connection terminals, each of the connection terminals is electrically connected with one of the first binding terminals and one of the second binding terminals, and a width of the connection terminals is less than or equal to a width of the second binding terminals or the first binding terminals.

Optionally, in the embodiments of the present application, the plurality of the connection terminals include a plurality of first connection terminals and a plurality of second connection terminals, and the first connection terminals are staggered to the second connection terminals, and one of the first connection terminals is electrically connected to one of the first binding terminals, and one of the second connection terminals is electrically connected to one of the second binding terminals.

Optionally, in the embodiments of the present application, the display panel further includes:

an adhesive layer, the adhesive layer disposed between the first liquid crystal cell and the second liquid crystal cell, and configured for bonding the first liquid crystal cell and the second liquid crystal cell.

Optionally, in the embodiments of the present application, the display panel further includes a conductive layer, the conductive layer is disposed on a surface of the flexible circuit board close to the first binding terminals and the second binding terminals.

Optionally, in the embodiments of the present application, the first liquid crystal cell further includes a first coincidence portion, the first coincidence portion is located on a side of the first epitaxial portion; and wherein the first liquid crystal cell includes a first driving substrate, the first driving substrate corresponds to the first coincidence portion and the first epitaxial portion, the first driving substrate includes first metal wirings, the first metal wirings are disposed on a surface of the first epitaxial portion facing the second epitaxial portion, and the first metal wirings are electrically connected to the first binding terminals;

the second liquid crystal cell further includes a second coincidence portion, the second coincidence portion is located on a side of the second epitaxial portion;

wherein, the second liquid crystal cell includes a second driving substrate, the second driving substrate corresponds to the second coincidence portion and the second epitaxial portion, and the second driving substrate includes second metal wirings, the second metal wirings are disposed on a surface of the second epitaxial portion facing away from the first epitaxial portion, and the second metal wirings are electrically connected to the second binding terminals.

Optionally, in the embodiments of the present application, the first liquid crystal cell further includes a first liquid crystal layer and a first opposite substrate, the first liquid crystal layer is disposed between the first driving substrate and the first opposite substrate, and the first liquid crystal layer corresponds to the first coincidence portion;

the second liquid crystal cell further includes a second liquid crystal layer and a second opposite substrate, the second liquid crystal layer is disposed between the second driving substrate and the second opposite substrate, and the second liquid crystal layer corresponds to the second coincidence portion.

Optionally, in the embodiments of the present application, the first liquid crystal cell is a dimming liquid crystal cell, and the second liquid crystal cell is a display liquid crystal cell.

Correspondingly, the embodiments of the present application also provide a manufacturing method of a display panel, wherein the manufacturing method of the display panel includes following steps:

providing a first liquid crystal cell and a second liquid crystal cell, wherein, the first liquid crystal cell includes a first epitaxial portion, the first epitaxial portion includes a plurality of first binding terminals, and the first binding terminals are disposed on a side of the first epitaxial portion; the second liquid crystal cell includes a second epitaxial portion, the second epitaxial portion includes a plurality of second binding terminals, the second binding terminals are disposed on a side of the second epitaxial portion, and the second binding terminals and the first binding terminals are located on a same side;

bonding a flexible circuit board on the first binding terminals and the second binding terminals, so that the flexible circuit board and the first binding terminals and the second binding terminals are electrically connected.

Advantageous Effects

An embodiment of the present application provides a display panel and a manufacturing method of thereof, the display panel includes the first liquid crystal cell, the second liquid crystal cell, and the flexible circuit board. The first liquid crystal cell includes the first epitaxial portion. The first epitaxial portion includes the first binding terminals, and the first binding terminals are disposed on the side of the first epitaxial portion. The second liquid crystal cell is disposed on the first liquid crystal cell. The second liquid crystal cell includes the second epitaxial portion. The second epitaxial portion includes the second bonding terminals. The second binding terminals are disposed on the side of the second epitaxial portion, and the second binding terminals and the first binding terminals are located on the same side. The flexible circuit board is electrically connected with the first binding terminals and the second binding terminals. In the display panel provided by the present application, a flexible circuit board is used to bind the first liquid crystal cell and the second liquid crystal cell, which solves a problem that the two liquid crystal cells in the prior art require two flexible circuit boards for binding respectively, which leads to a problem of high manufacturing cost of the display panel. In addition, in the display panel provided by the present application, only one flexible circuit board is required to bind the first liquid crystal cell and the second liquid crystal cell, that is, only one binding process is required to complete assembly steps of the first liquid crystal cell, the second liquid crystal cell and the flexible circuit board, thereby increasing a production cycle of the display panel and enhancing a competitiveness of a product.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. The drawings in the following description merely illustrate some embodiments of the present application. Other drawings may also be obtained by those skilled in the art according to these figures without paying creative work.

FIG. 7 is a step flowchart diagram of a manufacturing method of a display panel provided by an embodiment of the present application.

DESCRIPTION OF SPECIFIC EMBODIMENTS OF THE INVENTION

Figure 1:
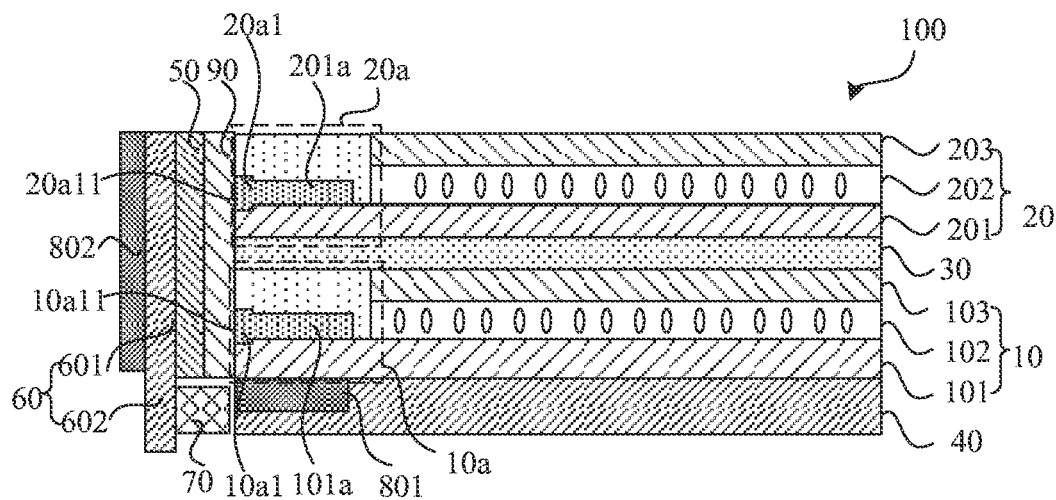
FIG. 1 is a schematic diagram of a first structure of a display panel provided by an embodiment of the present application.

In order to make the objective, technical solution and advantages of the present application clearer, the present application will be further described in detail below with reference to the accompanying drawings. Referring to the figures in the accompanying drawings. The components with the same reference numbers represent the same or similar components. The following description is based on the illustrated specific embodiments of the present disclosure, and should not be construed to limit the other specific embodiments which are not described in detail herein. The word "embodiment" configured in this specification means an example, example, or illustration.

In the description of the present disclosure, it is to be understood that the azimuth or positional relationships indicated by the terms "center", "longitudinal", "transverse", "length", "width", "thickness", "upper", "lower", "front", "back", "left", "right", "vertical", "horizontal", "top", "bottom", "inside", "outside", "clockwise", "counter-clockwise", etc., are based on the azimuth or positional relationship shown in the drawings, merely for the purpose of assisting and simplify the description, rather than indicating or implying that the indicated device or element must have a specific orientation, and be constructed and operated in a particular orientation. Therefore, these terms cannot be construed as limiting the present disclosure. In addition, the terms "first" and "second" are only configured for descriptive purposes, and cannot be understood as indicating or implying relative importance or implicitly indicating the number of indicated technical features. Therefore, the features defined with "first" and "second" may explicitly or implicitly include one or more of the features. In the description of the present application, "a plurality of" means two or more than two, unless otherwise specifically defined.

Embodiments of the present application provide a display panel and a manufacturing method thereof. Each of them will be described in detail below. It should be noted that the description order of the following embodiments is not intended to limit the preferred order of the embodiments.

An embodiment of the present application provides a display panel, the display panel includes a first liquid crystal cell, a second liquid crystal cell, and a flexible circuit board. The first liquid crystal cell includes a first epitaxial portion. The first epitaxial portion includes a plurality of first binding terminals, and the first binding terminals are disposed on a side of the first epitaxial portion. The second liquid crystal cell is disposed on the first liquid crystal cell. The second liquid crystal cell includes a second epitaxial portion. The second epitaxial portion includes a plurality of second bonding terminals. The second binding terminals are disposed on a side of the second epitaxial portion, and the second binding terminals and the first binding terminals are located on a same side. The flexible circuit board is electrically connected with the first binding terminals and the second binding terminals. In the display panel provided by the present application, a flexible circuit board is used to bind the first liquid crystal cell and the second liquid crystal cell, which solves a problem that two liquid crystal cells in the prior art require two flexible circuit boards for binding respectively, which leads to a problem of high manufacturing cost of the display panel. In addition, in the display panel provided by the present application, only one flexible circuit board is required to bind the first liquid crystal cell and the second liquid crystal cell, that is, only one binding process is required to complete assembly steps of the first liquid crystal cell, the second liquid crystal cell, and the flexible circuit board, thereby increasing a production cycle of the display panel and enhancing competitiveness of a product. The display panel provided by the present application will be described in detail below through specific embodiments.

Figure 2:
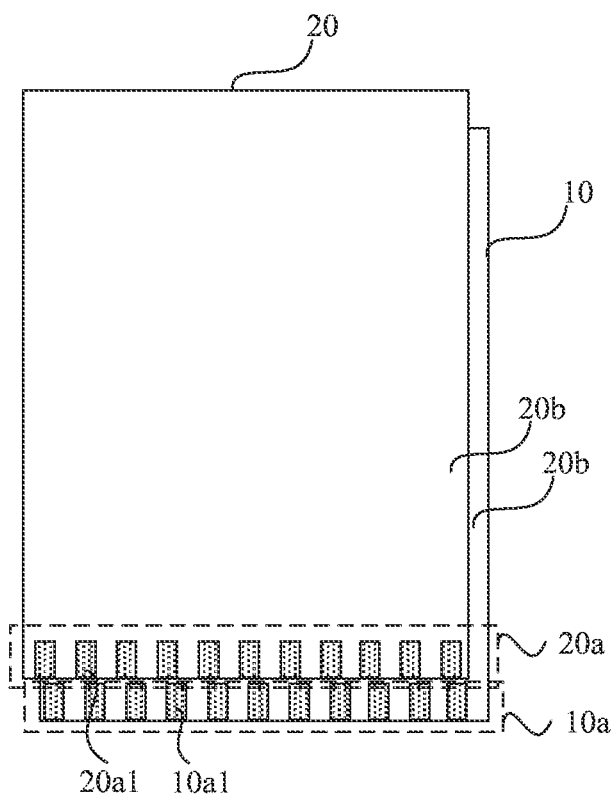
FIG. 2 is a schematic diagram of a first structure of a first liquid crystal cell and a second liquid crystal cell provided by an embodiment of the present application.

Please refer to FIG. 1 and FIG. 2, FIG. 1 is a schematic diagram of a first structure of a display panel provided by the present application. FIG. 2 is a schematic diagram of a first structure of a first liquid crystal cell and a second liquid crystal cell provided by the present application. The display panel 100 provided by the present application includes a backlight module 40, a first liquid crystal cell 10, a second liquid crystal cell 20, an adhesive layer 30, a conductive glue 50, a flexible circuit board 60, and a driving chip 70. Specifically, the first liquid crystal cell is disposed on the backlight module 40. The first liquid crystal cell 10 includes a first epitaxial portion 10a. The first epitaxial portion 10a includes a plurality of first bonding terminals 10a1. The first binding terminals 10a1 are disposed on a side of the first epitaxial portion 10a. The second liquid crystal cell 20 is disposed on the first liquid crystal cell 10. The adhesive layer 30 is disposed between the first liquid crystal cell 10 and the second liquid crystal cell 20 for bonding the first liquid crystal cell 10 and the second liquid crystal cell 20. The second liquid crystal cell 20 includes a second epitaxial portion 20a. The second epitaxial portion 20a includes a plurality of second bonding terminals 20a1. The second binding terminals 20a1 are disposed on a side of the second epitaxial portion 20a. And the second binding terminals 20a1 and the first binding terminals 10a1 are located on a same side. The flexible circuit board 60 is electrically connected to the first binding terminals 10a1 and the second binding terminals 20a1. In the embodiment of the present application, one flexible circuit board 60 is used to bind the first liquid crystal cell 10 and the second liquid crystal cell 20, which solves a problem of the prior art that two liquid crystal cells are needed to be bound with two flexible circuit boards respectively, which leads to high manufacturing cost of a display panel.

It should be noted that, in some embodiments, the first epitaxial portion 10a and the second epitaxial portion 20a are at least partially staggered.

In some embodiments, the first liquid crystal cell 10 further includes a first coincidence portion 10b. The first coincidence portion 10b is located on a side of the first epitaxial portion 10a. The first liquid crystal cell 10 includes a first driving substrate 101, a first liquid crystal layer 102, and a first opposite substrate 103. The first liquid crystal layer 102 is disposed between the first driving substrate 101 and the first opposite substrate 103. The first driving substrate 101 corresponds to the first coincidence portion 10b and the first epitaxial portion 10a. The first driving substrate 101 includes first metal wirings 101a. The first metal wirings 101a are disposed on a surface of the first epitaxial portion 10a facing the second epitaxial portion 20a. The first metal wirings 101a are electrically connected to the first bonding terminals 10a1. The first liquid crystal layer 102 and the first opposite substrate 103 correspond to the first coincidence portion 10b. The first binding terminals 10a1 are located on the first driving substrate 101. The second liquid crystal cell 20 further includes a second coincidence portion 20b. The second coincidence portion 20b is located on a side of the second epitaxial portion 20a. The second liquid crystal cell 20 includes a second driving substrate 201, a second liquid crystal layer 202, and a second opposite substrate 203. The second liquid crystal layer 202 is disposed between the second driving substrate 201 and the second opposite substrate 203. The second driving substrate 201 corresponds to the second coincidence portion 20b and the second epitaxial portion 20a. The second driving substrate 201 includes second metal wirings 201a. The second metal wirings 201a are disposed on a surface of the second epitaxial portion 20a facing away from the first epitaxial portion 10a. The second metal wirings 201a are electrically connected to the second bonding terminals 20a1. The second liquid crystal layer 202 and the second opposite substrate 203 correspond to the second coincidence portion 20b. The second binding terminals 20a1 are located on the second driving substrate 201. In this embodiment of the present application, the first opposite substrate 103 and the second opposite substrate 203 may be color filter substrates. The display panel provided by the embodiment of the present application utilizes one flexible circuit board 60 to bind the first liquid crystal cell 10 and the second liquid crystal cell 20, thereby reducing production cost of the display panel.

It should be noted that, in some embodiments, the first liquid crystal cell 10 can be used as a dimming liquid crystal cell, and the second liquid crystal cell 20 can be used as a display liquid crystal cell. Alternatively, the first liquid crystal cell 10 may be used as a first display liquid crystal cell, and the second liquid crystal cell 20 may be used as a second display liquid crystal cell.

Please continue to refer to FIG. 1 and FIG. 2, in some embodiments, the first bonding terminals 10a1 include first side surfaces 10a11. The second bonding terminals 20a1 include second side surfaces 20a11. The first side surfaces 10a11 correspond to the second side surfaces 20a11. The first side surfaces 10a11 and the second side surfaces 20a11 are flush. Since the first side surfaces 10a11 and the second side surfaces 20a11 are flush, fast and precise binding of the flexible circuit board 60 to the first binding terminals 10a1 and the second binding terminals 20a1 can be achieved.

The flexible circuit board 60 includes a first portion 601 and an extension portion 602. The conductive glue 50 is attached to the first side surfaces 10a11 and the second side surfaces 20a11, and the first portion 601 of the flexible circuit board 60 is attached to a side of the conductive glue 50 away from the first binding terminals 10a1 and the second binding terminals 20a1. The driving chip 70 is disposed on the extension portion 602 of the flexible circuit board 60, and the driving chip 70 and the first liquid crystal cell 10 are located on a same side of the flexible circuit board 60. In the embodiment of the present application, the first binding terminals 10a1, the second binding terminals 20a1, and the flexible circuit board 60 are electrically connected through the conductive glue 50. To prevent a direct contact connection between the first binding terminals 10a1, the second binding terminals 20a1, and the flexible circuit board 60 causing a problem of weak binding, in this embodiment of the present application, the conductive glue 50 is used to bind the first binding terminals 10a1, the second binding terminals 20a1, and the flexible circuit board 60 to increase stability of the display panel 100.

In some embodiments, along an arrangement direction of the first binding terminals 10a1 and the second binding terminals 20a1, at least a part of any one of the second binding terminals 20a1 is staggered to at least a part of the first binding terminals 10a1. At least a part of any one of the second binding terminals 20a1 is staggered to at least a part of the first binding terminals 10a1. In a specific embodiment, at least a part of any one of the second binding terminals 20a1 is staggered to at least a part of the first binding terminals 10al. At least a part of any one of the second binding terminals 20a1 is staggered to at least a part of the first binding terminals 10a1, which can reduce a pitch. For example, if the pitch is 16 microns, if the first binding terminal 10a1 and the second binding terminal 20a1 are arranged correspondingly, a width of the first binding terminals 10a1 or the second binding terminals 20a1 is 8 microns, and a width between two adjacent binding terminals 10a1 is 8 microns, and when any one of the first binding terminals 10a1 is staggered to one of the second binding terminals 20a1 partially, and a corresponding part of the first binding terminals 10a1 and the second binding terminals 20a1 is 7 microns, a distance between a corresponding binding terminal 10a1 and second binding terminals 20a1 is 4 microns, and the pitch is 11 microns. Therefore, when any one of the first binding terminals 10a1 is staggered to one of the second binding terminals 20a1 partially, a frame of the display panel 100 can be reduced, thereby realizing a narrow frame design.

In some embodiments, the first side surfaces 10a11 and the second side surfaces 20a11 are formed by a side edging process.

In some embodiments, a material of the conductive glue 50 is anisotropic conductive film (ACF). The conductive glue 50 is used as an adhesive to realize electrical conduction between the first binding terminals 10a1, the second binding terminals 20a1, and the flexible circuit board 60.

In some embodiments, a material of the conductive glue 50 may be composed of a plurality of conductive gold balls arranged in an array. Diameters of the conductive gold balls may be less than or equal to 3 microns. Preferably, the diameters of the conductive gold balls are less than or equal to 2 microns. For example, in some embodiments, the diameter of the conductive gold balls may be any of 0.2 microns, 0.5 microns, 0.8 microns, 1.0 microns, 1.2 microns, 1.5 microns, 1.8 microns, or 2.0 microns. In the embodiment of the present application, the diameters of the conductive gold balls are set to be less than or equal to 3 microns, which ensures good electrical conduction between the first binding terminals 10a 1, the second binding terminals 20a1, and the flexible circuit board 60.

Figure 3:
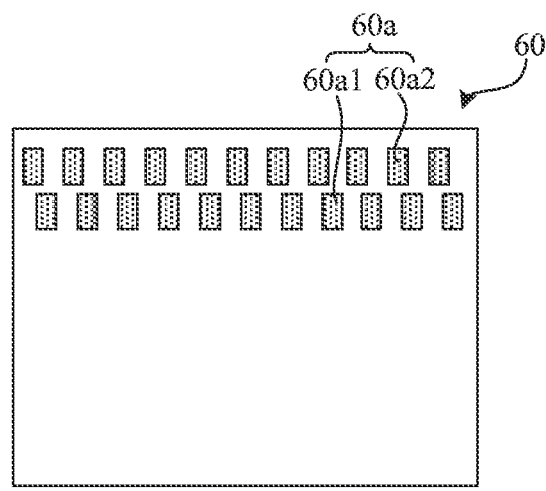
FIG. 3 is a schematic structural diagram of a flexible circuit board provided by an embodiment of the present application.

Please refer to FIG. 3, FIG. 3 is a schematic structural diagram of a flexible circuit board provided by the present application. The flexible circuit board 60 includes a plurality of connection terminals 60a. One of the connection terminals 60a is electrically connected to one of the first binding terminals 10a1 and one of the second binding terminal 20a1. A width of the connection terminals 60a is less than or equal to a width of the second binding terminals 20a1 or a width of the first binding terminals 10a1. In the embodiment of the present application, by adjusting the width of the connection terminals 60a, the width of the connection terminals 60a is less than or equal to the width of the second binding terminals 20a1 or the width of the first binding terminals 10a1, therefore, it is possible to avoid a short-circuit problem caused by an excessively large width of the connection terminals 60a.

The plurality of the connection terminals 60a includes a plurality of first connection terminals 60a1 and a plurality of second connection terminals 60a2. The plurality of first connection terminals 60a1 are arranged in an array. The plurality of second connection terminals 60a2 are arranged in an array. The first connection terminals 60a1 are staggered to the second connection terminals 60a2. In addition, a part of any one of the first connection terminals 60a1 corresponds to a part of the second connection terminal 60a2 corresponding thereto. The first connection terminals 60a1 is electrically connected to the first binding terminals 10a1. The second connection terminals 60a2 is electrically connected to one of the second binding terminals 20a1. This arrangement is beneficial to preventing occurrence of misalignment during the binding of the flexible circuit board 60 and a risk of short-circuiting.

In some embodiments, the display panel 100 further includes a conductive layer 90. The conductive layer 90 is disposed on a surface of the flexible circuit board 60 close to the first binding terminals 10a1 and the second binding terminals 20a1. In the embodiment of the present application, the conductive layer 90 is disposed between the first binding terminals 10a1, the second binding terminals 20a1, and the flexible circuit board 60 to realize side binding of the flexible circuit board 60. Since there may be poor contact between the flexible circuit board 60 and the first binding terminals 10a1 and the second binding terminals 20a1, in this embodiment of the present application, the conductive layer 90 is disposed on a surface of the flexible circuit board 60 close to the first binding terminals 10a1 and the second binding terminal 20a1, which increases an electrical conductivity between the flexible circuit board 60, the first binding terminals 10a1, and the second binding terminals 20a1.

The conductive layer 90 is printed with a conductive material on the first side surfaces 10a11 and the second side surfaces 20a11. A material of the conductive layer 90 includes at least one of metal silver, gold, nickel, and tin, but is not limited to these.

In some embodiments, the display panel 100 further includes a first polarizer and a second polarizer, and the first polarizer is disposed on a surface of the first coincidence portion 10b away from the second liquid crystal cell 20. The second polarizer is disposed on a surface of the second coincidence portion 20b away from the first liquid crystal cell 10. The display panel 100 further includes a first adhesive layer 801 and a second adhesive layer 802. The first adhesive layer 801 is disposed on a side of the first epitaxial portion 10a away from the second epitaxial portion 20a. And the first adhesive layer 801 does not exceed a surface of the first polarizer. The second adhesive layer 802 is disposed on a side of the flexible circuit board 60 away from the first binding terminals 10a1 and the second binding terminals 20a1. In the embodiment of the present application, the first adhesive layer 801 is disposed on the side of the first epitaxial portion 10a away from the second epitaxial portion 20a and the second adhesive layer 802 is disposed on the side of the first flexible circuit board 60 away from the conductive adhesive 50 to increase a tensile force, the first bonding terminals 10a1 and the second bonding terminals 20a2 are protected from corrosion.

It should be noted that, in the embodiment of the present application, the driving chip 70 is disposed on the epitaxial portion 602 of the flexible circuit board 60, and the driving chip 70 and the first liquid crystal cell 10 are located on a same side of the flexible circuit board 60. That is, the driving chip 70 and the flexible circuit board 60 form a chip-on-film (COF) structure. The chip on film is a die soft film assembly technology that fixes an integrated circuit (IC) on a flexible circuit board. It uses a soft additional circuit board as a packaged chip carrier to combine the chip with a flexible substrate circuit, or it solely refers to a flexible add-on circuit board of a unpackaged chip. The soft additional circuit board includes tape and reel packaging production (TAB substrate, whose process is called TCP), flexible board connection chip components, and flexible IC carrier board packaging.

In the embodiment of the present application, the chip-on-film technology is used to realize bonding, which reduces the frame of the display panel 100 and realizes of the narrow frame design of the display panel 100.

Figure 4:
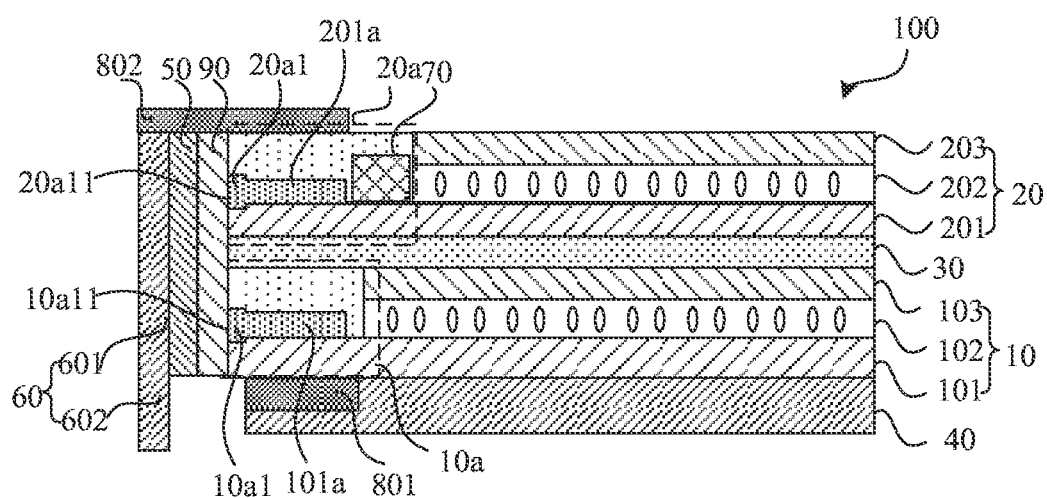
FIG. 4 is a schematic diagram of a second structure of a display panel provided by an embodiment of the present application.
Figure 5:
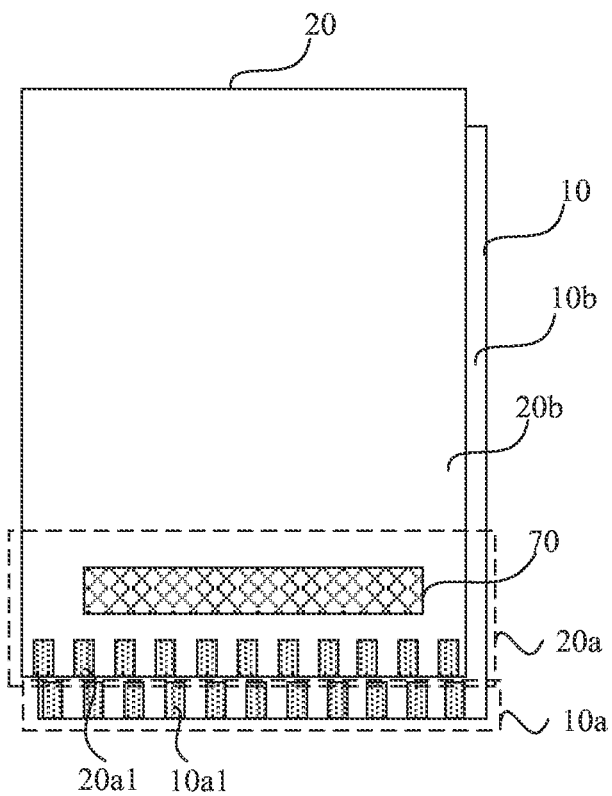
FIG. 5 is a schematic diagram of a second structure of the first liquid crystal cell and the second liquid crystal cell provided by an embodiment of the present application.

Please refer to FIG. 4 and FIG. 5, FIG. 4 is a schematic diagram of a second structure of a display panel provided by the present application. FIG. 5 is a schematic diagram of a second structure of the first liquid crystal cell and the second liquid crystal cell provided by the present application. A difference between the display panel 100 provided by the embodiment of the present application and the display panel 100 in FIG. 1 is that, the driving chip 70 is located on a side of the second epitaxial portion 20a away from the first liquid crystal cell 10. Alternatively, the drive chip 70 is located on a side of the first epitaxial portion 10a close to the second liquid crystal cell 20. In addition, the first adhesive layer 801 is disposed on a surface of the first epitaxial portion 10a away from the second epitaxial portion 20a, and the first adhesive layer 801 corresponds to at least the first binding terminals 10a1. The second adhesive layer 802 is disposed on a surface of the second epitaxial portion 20a away from the first epitaxial portion 10a, and the second adhesive layer 802 corresponds to at least the second binding terminals 20a1. The second adhesive layer 802 extends to sides of the conductive glue 50 and the flexible circuit board 60. In the embodiment of the present application, the driving chip 70 is disposed on the second driving substrate 201, that is, a chip-on-glass (COG) packaging technology is used. The chip-on-glass packaging technology is to directly encapsulate a driver IC on a liquid crystal glass through anisotropic conductive adhesive (ACF), so that conductive bumps of the driver IC and ITO transparent conductive pads on the liquid crystal glass are interconnected and packaged together, thereby realize lighting of a screen. For designers of industrial displays, automotive displays, and portable devices, LCD panels with COG packaging technology have thinner display modules and higher reliability than traditional packaging, providing customers with flexible designs and many advantages of cost-effectiveness.

It should be noted that, in the embodiment of the present application, the display panel 100 also includes the first polarizer and the second polarizer, and the first polarizer is disposed on the surface of the first coincidence portion 10b away from the second liquid crystal cell 20. The second polarizer is disposed on the surface of the second coincidence portion 20b away from the first liquid crystal cell 10. The first adhesive layer 801 does not exceed the surface of the first polarizer. The second adhesive layer 802 does not exceed the surface of the second polarizer. In the embodiment of the present application, at least a part of any one of the second binding terminals 20a1 is staggered to at least a part of the first binding terminals 10a1. In a specific embodiment, at least a part of any one of the second binding terminals 20a1 is staggered to at least a part of the first binding terminals 10al. At least a part of any one of the second binding terminals 20a1 is staggered to at least a part of one of the first binding terminals 10a1, which can reduce the pitch. For example, if the pitch is 120 microns, if the first binding terminals 10a1 are arranged corresponding to the second binding terminals 20a1, the width of the first binding terminals 10a1 or the second binding terminals 20a1 is 60 microns, and the width between two adjacent binding terminals 10a1 is 60 microns, and when the first binding terminals 10a1 is staggered to the second binding terminals 20a1 partially, and a corresponding part of the first binding terminals 10a1 and the second binding terminals 20a1 is 30 microns, a distance between a corresponding binding terminal 10a1 and the second binding terminals 20a1 is 30 microns, and the pitch is 60 microns. Therefore, when the first binding terminals 10a1 are staggered to the second binding terminals 20a1 partially, the frame of the display panel 100 can be reduced, thereby realizing the narrow frame design.

It should be noted that, in this embodiment, the first liquid crystal cell 10 may be used as a display liquid crystal cell, and the second liquid crystal cell 20 may be used as a dimming liquid crystal cell. Alternatively, the first liquid crystal cell 10 is used as a dimming liquid crystal cell, and the second liquid crystal cell 20 is used as a display liquid crystal cell.

Figure 6:
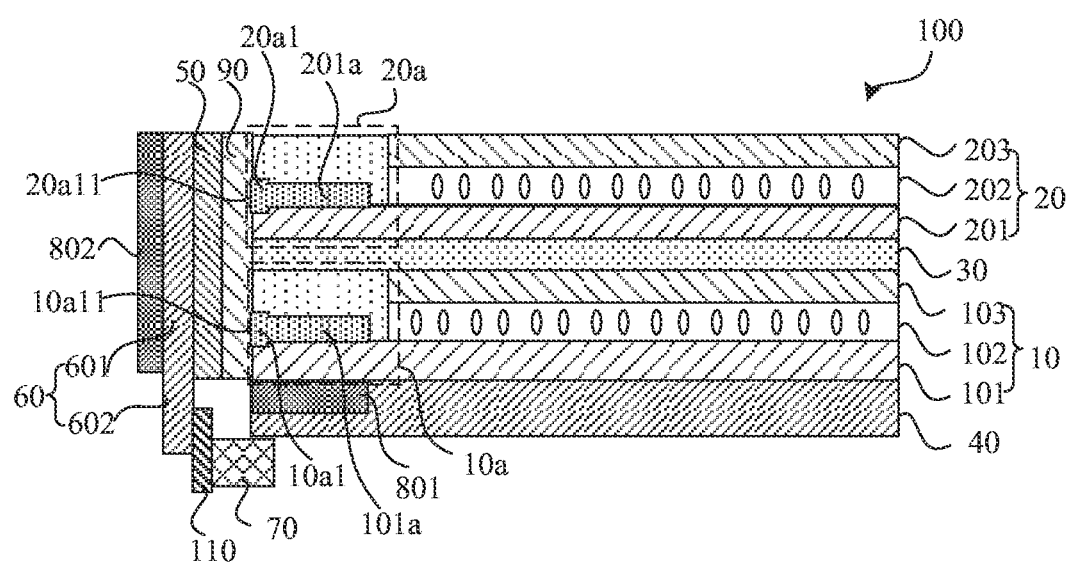
FIG. 6 is a schematic diagram of a third structure of a display panel provided by an embodiment of the present application.

Please refer to FIG. 6, FIG. 6 is a schematic diagram of a third structure of a display panel provided by an embodiment the present application. A difference between the display panel 100 provided by the embodiment the present application and the display panel 100 in FIG. 1 is that the display panel further includes a printed circuit board 110. The printed circuit board 110 is disposed on a side of the extension portion of the flexible circuit board 60 close to the first binding terminals 10a1 and the second binding terminals 20a1. And the driving chip 70 and the first liquid crystal cell 10 are located on a same side of the printed circuit board 110. In the embodiment of the present application, the driving chip 70 is disposed on the printed circuit board 110, that is, a chip on a printed circuit board (chip on Pi, COP) packaging technology is used to reduce the frame of the display panel 100 and realize the narrow frame design.

Correspondingly, an embodiment of the present application further provides a manufacturing method of a display panel. Please refer to FIG. 7, FIG. 7 is a step flowchart diagram of the manufacturing method of the display panel provided by the embodiment the present application. The manufacturing method of the display panel includes the following steps:

Step B001: providing a first liquid crystal cell and a second liquid crystal cell, wherein the first liquid crystal cell 10 includes a first epitaxial portion 10a. The first epitaxial portion 10a includes a plurality of first bonding terminals 10al. The first binding terminals 10a1 are disposed on a side of the first epitaxial portion 10a. The second liquid crystal cell 20 includes a second epitaxial portion 20a. The second epitaxial portion 20a includes a plurality of second bonding terminals 20a1. The second binding terminals 20a1 are disposed on a side of the second epitaxial portion 20a. In addition, the second binding terminals 20a1 and the first binding terminals 10a1 are located on a same side.

In one embodiment, a step B001 includes adhering the adhesive layer 30 on the first liquid crystal cell 10, and then adhering the second liquid crystal cell 20 on the adhesive layer 30. In this step, a distance between the first liquid crystal cell 10 and the second liquid crystal cell 20 in a thickness direction is less than or equal to 0.22 mm. Preferably, the distance between the first liquid crystal cell 10 and the second liquid crystal cell 20 in the thickness direction ranges from 0.1 mm to 0.15 mm. A lamination accuracy of the first liquid crystal cell 10 and the second liquid crystal cell 20 in a horizontal direction ranges from −4 microns to 4 microns. Preferably, the lamination accuracy of the first liquid crystal cell 10 and the second liquid crystal cell 20 in the horizontal direction ranges from −2 microns to 2 microns. A vertical lamination accuracy can range from −100 microns to 100 microns according to a normal lamination accuracy.

Subsequently, grinding a side of the first epitaxial portion 10a close to the first bonding terminals 10a1 and a side of the second epitaxial portion 20a close to the second bonding terminals 20a1 simultaneously to expose a first side surfaces 10a11 and a second side surfaces 20a11.

In some embodiments, before attaching the second liquid crystal cell 20 to the adhesive layer 30, the manufacturing method of the display panel further includes disposing a driver chip 70 on the second epitaxial portion 20a, and the driver chip 70 is disposed on a side of the second epitaxial portion 20a close to the second coincidence portion 20b.

Step B002: Binding a flexible circuit board 60 on the first binding terminals 10a1 and the second binding terminals 20a1, so that the flexible circuit board 60 is electrically connected to the first binding terminals 10a1 and the second binding terminals 20a1. Please refer to FIG. 1 to FIG. 6.

In the manufacturing method of the display panel provided by the present application, the first liquid crystal cell 10 and the second liquid crystal cell 20 are bound by one flexible circuit board 60, which can reduce one binding process, thereby increasing the production cycle of the display panel. In addition, a frame of the display panel can be reduced, and competitiveness of the product can be improved.

In summary, although the present application has been disclosed in preferred embodiments as above, the above-mentioned preferred embodiments are not intended to limit the present application. Those of ordinary skill in the art can make various modifications without departing from the spirit and scope of the present application. Therefore, the protection scope of the present application is subject to the scope defined by the claims.

What is claimed is:

1. A display panel, comprising:
   a first liquid crystal cell, the first liquid crystal cell comprising a first epitaxial portion, the first epitaxial portion comprising a plurality of first binding terminals, and the first binding terminals disposed on a side of the first epitaxial portion;
   a second liquid crystal cell, the second liquid crystal cell disposed on the first liquid crystal cell, the second liquid crystal cell comprising a second epitaxial portion, the second epitaxial portion comprising a plurality of second binding terminals, the second binding terminals disposed on a side of the second epitaxial portion, and the second binding terminals and the first binding terminals located on a same side; and
   a flexible circuit board, the flexible circuit board electrically connected to the first binding terminals and the second binding terminals;
   wherein the first binding terminals comprise first side surfaces, and the second binding terminals comprise second side surfaces; the flexible circuit board comprises a first portion and an extension portion extending along a first direction, the display panel further comprises a conductive glue, the conductive glue is attached to the first side surfaces and the second side surface, and the first portion of the flexible circuit board is attached to a side of the conductive glue away from the first binding terminals and the second binding terminals.

2. The display panel according to claim 1, wherein the first side surfaces correspond to a side surface of the first epitaxial portion; and the second side surfaces correspond to a side surface of the second epitaxial portion, and the first side surfaces and the second side surfaces are flush.

3. The display panel according to claim 2, wherein along an arrangement direction of the first binding terminals and the second binding terminals, at least a part of any one of the second binding terminals is staggered to at least a part of one of the first binding terminals.

4. The display panel according to claim 1, wherein the display panel further comprises:
   a driving chip, the driving chip disposed on the extension portion of the flexible circuit board, and the driving chip and the first liquid crystal cell are located on a same side of the flexible circuit board.

5. The display panel according to claim 4, wherein the display panel further comprises:
   a first adhesive layer, the first adhesive layer disposed on a side of the first epitaxial portion away from the second epitaxial portion;
   a second adhesive layer, the second adhesive layer disposed on a side of the flexible circuit board away from the first binding terminals and the second binding terminals.

6. The display panel according to claim 1, wherein the display panel further comprises:
   a driving chip, the driving chip disposed on a side of the second epitaxial portion away from the first liquid crystal cell.

7. The display panel according to claim 6, wherein the display panel further comprises:
   a first adhesive layer, the first adhesive layer disposed on a side of the first epitaxial portion away from the second epitaxial portion;
   a second adhesive layer disposed on a surface of the second epitaxial portion away from the first epitaxial portion, the second adhesive layer at least corresponds to the second binding terminals, and the second adhesive layer extends to side surfaces of the conductive glue and the flexible circuit board.

8. The display panel according of claim 1, wherein the display panel further comprises:
   a driving chip, the driving chip located on a side of the first epitaxial portion close to the second liquid crystal cell.

9. The display panel according of claim 1, wherein the display panel further comprises:
   a printed circuit board, the printed circuit board disposed on the extension portion of the flexible circuit board, and the printed circuit board and the first liquid crystal cell located on a same side of the flexible circuit board;
   a driving chip, the driving chip and the first liquid crystal cell located on a same side of the printed circuit board.

10. The display panel according to claim 1, wherein a material of the conductive glue comprises conductive gold balls arranged in an array.

11. The display panel according of claim 10, wherein diameters of the conductive gold balls are less than or equal to 3 microns.

12. The display panel according of claim 1, wherein the flexible circuit board comprises a plurality of connection terminals, each of the connection terminals is electrically connected with one of the first binding terminals and one of the second binding terminals, and a width of the connection terminals is less than or equal to a width of the second binding terminals or the first binding terminals.

13. The display panel according to claim 12, wherein the plurality of the connection terminals comprise a plurality of first connection terminals and a plurality of second connection terminals, and the first connection terminals are staggered to the second connection terminals, and one of the first connection terminals is electrically connected to one of the first binding terminals, and one of the second connection terminals is electrically connected to one of the second binding terminals.

14. The display panel according to claim 1, wherein the display panel further comprises:
   an adhesive layer, the adhesive layer disposed between the first liquid crystal cell and the second liquid crystal cell, and configured for bonding the first liquid crystal cell and the second liquid crystal cell.

15. The display panel according to claim 1, wherein the display panel further comprises a conductive layer, the conductive layer is disposed on a surface of the flexible circuit board close to the first binding terminals and the second binding terminals; and wherein the conductive layer is disposed between the conductive glue and the first binding terminals, and between the conductive glue and the second binding terminals.

16. The display panel according to claim 1, wherein the first liquid crystal cell further comprises a first coincidence portion, the first coincidence portion is located on a side of the first epitaxial portion; and wherein the first liquid crystal cell comprises a first driving substrate, the first driving substrate corresponds to the first coincidence portion and the first epitaxial portion, the first driving substrate comprises first metal wirings, the first metal wirings are disposed on a surface of the first epitaxial portion facing the second epitaxial portion, and the first metal wirings are electrically connected to the first binding terminals;

the second liquid crystal cell further comprises a second coincidence portion, the second coincidence portion is located on a side of the second epitaxial portion;

wherein, the second liquid crystal cell comprises a second driving substrate, the second driving substrate corresponds to the second coincidence portion and the second epitaxial portion, and the second driving substrate comprises second metal wirings, the second metal wirings are disposed on a surface of the second epitaxial portion facing away from the first epitaxial portion, and the second metal wirings are electrically connected to the second binding terminals.

17. The display panel according to claim 16, wherein the first liquid crystal cell further comprises a first liquid crystal layer and a first opposite substrate, the first liquid crystal layer is disposed between the first driving substrate and the first opposite substrate, and the first liquid crystal layer corresponds to the first coincidence portion;

the second liquid crystal cell further comprises a second liquid crystal layer and a second opposite substrate, the second liquid crystal layer is disposed between the second driving substrate and the second opposite substrate, and the second liquid crystal layer corresponds to the second coincidence portion.

18. The display panel according to claim 1, wherein the first liquid crystal cell is a dimming liquid crystal cell, and the second liquid crystal cell is a display liquid crystal cell.

19. A manufacturing method of a display panel, wherein the manufacturing method of the display panel comprises following steps:

providing a first liquid crystal cell and a second liquid crystal cell, wherein, the first liquid crystal cell comprises a first epitaxial portion, the first epitaxial portion comprises a plurality of first binding terminals, and the first binding terminals are disposed on a side of the first epitaxial portion; the second liquid crystal cell comprises a second epitaxial portion, the second epitaxial portion comprises a plurality of second binding terminals, the second binding terminals are disposed on a side of the second epitaxial portion, and the second binding terminals and the first binding terminals are located on a same side; and bonding a flexible circuit board on the first binding terminals and the second binding terminals, so that the flexible circuit board and the first binding terminals and the second binding terminals are electrically connected;

wherein the first binding terminals comprise first side surfaces, and the second binding terminals comprise second side surfaces; the flexible circuit board comprises a first portion and an extension portion extending along a first direction, the display panel further comprises a conductive glue, the conductive glue is attached to the first side surfaces and the second side surface, and the first portion of the flexible circuit board is attached to a side of the conductive glue away from the first binding terminals and the second binding terminals.

20. A display panel, comprising:

a first liquid crystal cell, the first liquid crystal cell comprising a first epitaxial portion, the first epitaxial portion comprising a plurality of first binding terminals, and the first binding terminals disposed on a side of the first epitaxial portion;

a second liquid crystal cell, the second liquid crystal cell disposed on the first liquid crystal cell, the second liquid crystal cell comprising a second epitaxial portion, the second epitaxial portion comprising a plurality of second binding terminals, the second binding terminals disposed on a side of the second epitaxial portion, and the second binding terminals and the first binding terminals located on a same side; and a flexible circuit board, the flexible circuit board electrically connected to the first binding terminals and the second binding terminals;

wherein the first liquid crystal cell further comprises a first coincidence portion and a first driving substrate; the first coincidence portion is located on a side of the first epitaxial portion; and the first driving substrate corresponds to the first coincidence portion and the first epitaxial portion, the first driving substrate comprises first metal wirings, the first metal wirings are disposed on a surface of the first epitaxial portion facing the second epitaxial portion, and the first metal wirings are electrically connected to the first binding terminals; and the second liquid crystal cell further comprises a second coincidence portion and a second driving substrate; the second coincidence portion is located on a side of the second epitaxial portion; and the second driving substrate corresponds to the second coincidence portion and the second epitaxial portion, and the second driving substrate comprises second metal wirings, the second metal wirings are disposed on a surface of the second epitaxial portion facing away from the first epitaxial portion, and the second metal wirings are electrically connected to the second binding terminals.

* * * * *